United States Patent [19]

Quarrie

[11] 4,040,191
[45] Aug. 9, 1977

[54] EDUCATIONAL GAME

[76] Inventor: Eugene A. Quarrie, 7 Laurel Hill Place, Armonk, N.Y. 10504

[21] Appl. No.: 618,330

[22] Filed: Oct. 1, 1975

[51] Int. Cl.² .......................... G09B 1/14; A63F 9/00
[52] U.S. Cl. .......................................... 35/1; 273/1 R
[58] Field of Search ................. 273/1 R, 142 R, 161; 35/8 R, 1, 9 D, 22 D, 31 A, 35 F; 40/68.4, 70 R, 33, 34; 211/129, 131; D7/2, 4

[56] References Cited

U.S. PATENT DOCUMENTS

| | | | |
|---|---|---|---|
| 375,095 | 12/1887 | Pollard | 35/74 |
| 2,177,790 | 10/1939 | Scott | 35/74 |
| 2,251,740 | 8/1941 | Konikoff | 211/131 |
| 2,720,038 | 10/1955 | Clark | 35/9 D X |
| 2,853,799 | 9/1958 | Magnusson et al. | 35/9 D |
| 2,872,741 | 2/1959 | Krueger et al. | 35/9 D |
| 3,050,871 | 8/1962 | Jacobs | 35/9 D |
| 3,222,069 | 12/1965 | Ruizzo | 273/142 R |
| 3,239,951 | 3/1966 | Benson | 35/74 |
| 3,449,841 | 6/1969 | Sveda | 35/22 R |
| 3,603,003 | 9/1971 | Ziegler | 35/9 D |
| 3,654,706 | 4/1972 | Perrella | 35/9 D |
| 3,708,893 | 1/1973 | Murphy | 35/9 D |
| 3,805,416 | 4/1974 | Plefkey | 35/9 D X |
| 3,879,041 | 4/1975 | Hester | 273/130 R |

*Primary Examiner*—William H. Grieb
*Attorney, Agent, or Firm*—Allen D. Brufsky

[57] ABSTRACT

An educational turntable game wherein one matches preselected printed concepts with a subject matter concept, such as synonyms, homonyms, antonyms, chemical symbols, etc.

4 Claims, 2 Drawing Figures

EDUCATIONAL GAME

BACKGROUND OF THE INVENTION

This invention relates to an educational game. More particularly, the invention relates to a game that is adapted to continually change at the desire of the operator such that a multitude of different learning concepts and subject areas may be employed.

The prior art teaches a variety of learning games for example, U.S. Pat. Nos. 2,720,038; 2,853,799; 2,872,741; 3,050,871; 3,603,003; 3,654,706; 3,708,893; 3,805,416; and others. All of the foregoing games enjoy at least one common drawback; they are unduly complicated and therefore one might not undertake using the same with the unfortunate result that their laudable purpose is not taken advantage of.

SUMMARY OF THE INVENTION

It is accordingly an object of the instant invention to provide for an improved education game.

It is another object to provide for the same without, however, rendering the same unduly complicated.

These and other objects of the invention will become more apparent from the following detailed disclosure and claims and by reference to the accompanying drawings in which:

Figure 1:
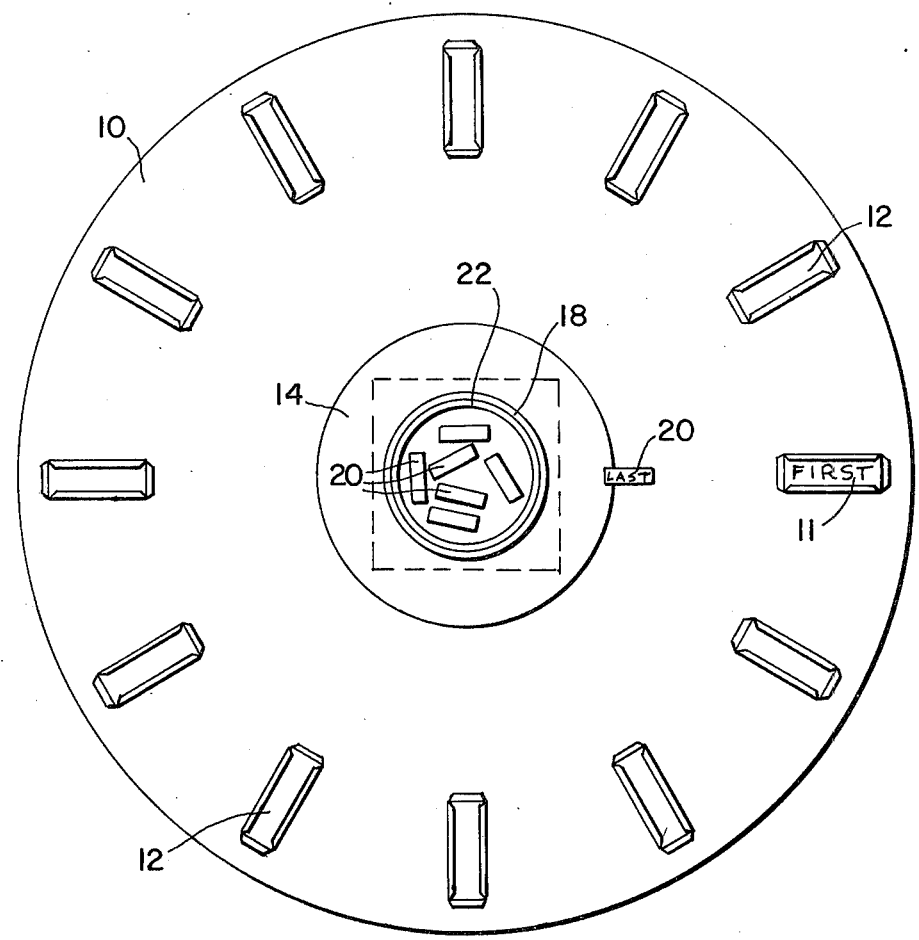
FIG. 1 is a top plan view of the game.
Figure 2:
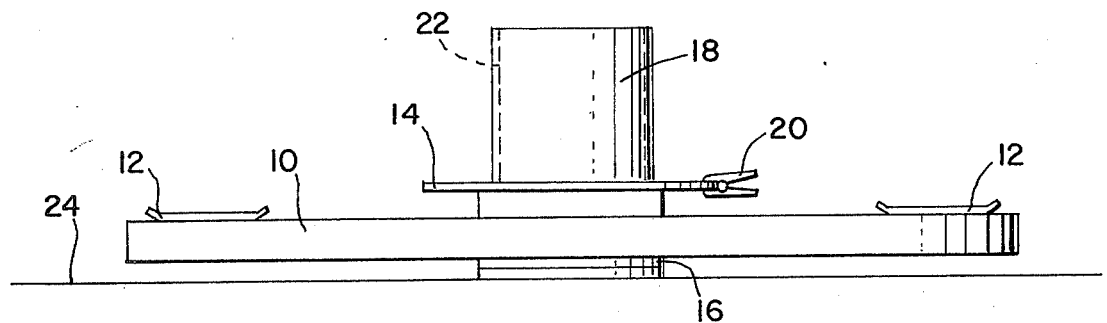
FIG. 2 is a side elevational view thereof.

Broadly speaking, the invention includes the provision of an educational game comprising a substantially planar support surface defining a substantially centrally located aperture, shaft means adapted to communicate with the aperture, the support member adapted to rotate about its own axis about the shaft means, platform means integral with the shaft means and disposed at one distal end thereof, a plurality of slotted channels disposed substantially equidistant from each other on the surface of the support, sleeve means open at at least one end thereof and disposed on the platform means, and a hollow walled housing open at at least one end thereof and adapted to receive and concentrically engage the sleeve means.

DETAILED DISCLOSURE

Referring more particularly to the drawings, there is shown an educational game device that broadly includes a substantially planar surface 10 that is adapted to rotate about its own axis. The member 10 will in the preferred embodiment be substantially circular or disc shaped and will include a plurality of slotted channels 12 that are adapted to each receive a removable learning concept, such as a word, picture, chemical symbol, color, etc. The slots 12 will preferably be disposed substantially equidistant from one another about the circumferential border or perimeter of the member 10.

Substantially in the center of the member 10 there will be disposed a platform 14 raised out of the plane of the member 10. Platform 14 will include a shaft portion 16 about which the member 10 rotates. Member 10 will generally define a central aperture to receive shaft 16 therethrough. Platform 14 will include a removable housing 18 thereon which is adapted to retain a plurality of clip means 20, that contain printed matter thereon. The printed matter on each clip means 20 will correlate with the printed matter contained on each of the members 11 adapted to engage slot 12. Clip means 20 are adapted to engage the outer perimeter or circumference of platform 14 by clipping thereon.

Housing 18 will generally be a hollow walled member having an open mouth portion that is adapted to engage a sleeve 22 open at one end by fitting thereover. Sleeve 22 will in point of fact retain a plurality of extra means 20 and have an internal diameter smaller than the external diameter of housing 18.

The entire assembly is adapted to rest upon a flat support surface 24 such as a table top or the like.

The game is played by simply selecting the proper clip means concept and attaching same to the platforms rotating support surface until the right concept in the slot is aligned therewith.

Since it is obvious that numerous changes and modifications can be made in the above-described details without departing from the spirit and nature of the invention, it is to be understood that all such changes and modifications are included within the scope of the invention.

I claim:

1. An educational game comprising a substantially planar support surface defining a substantially centrally located aperture, shaft means adapted to communicate with said aperture, said support surface adapted to rotate its own axis about said shaft means, platform means integral with said shaft means and disposed at one distal end thereof, a plurality of slotted channels disposed substantially equidistant from each other on a surface of said support surface, sleeve means open at at least one end thereof and disposed on said platform means, a hollow walled housing open at at least one end thereof and adapted to receive and concentrically engage said sleeve means, and a plurality of clip means containing printed matter thereon dispersed in said sleeve means, each of said clip means for selective clipped affixment to said platform means.

2. The game as defined in claim 1 wherein said support surface is substantially disc shaped.

3. The game as defined in claim 1 wherein the internal diameter of said sleeve is smaller than the external diameter of said housing.

4. The game as defined in claim 1 including a plurality of tabs adapted to engage said slotted channels, each tab containing printed matter thereon.

* * * * *